March 17, 1925.    1,530,048
C. H. HILL
VEHICLE BODY
Filed April 30, 1923    2 Sheets-Sheet 1
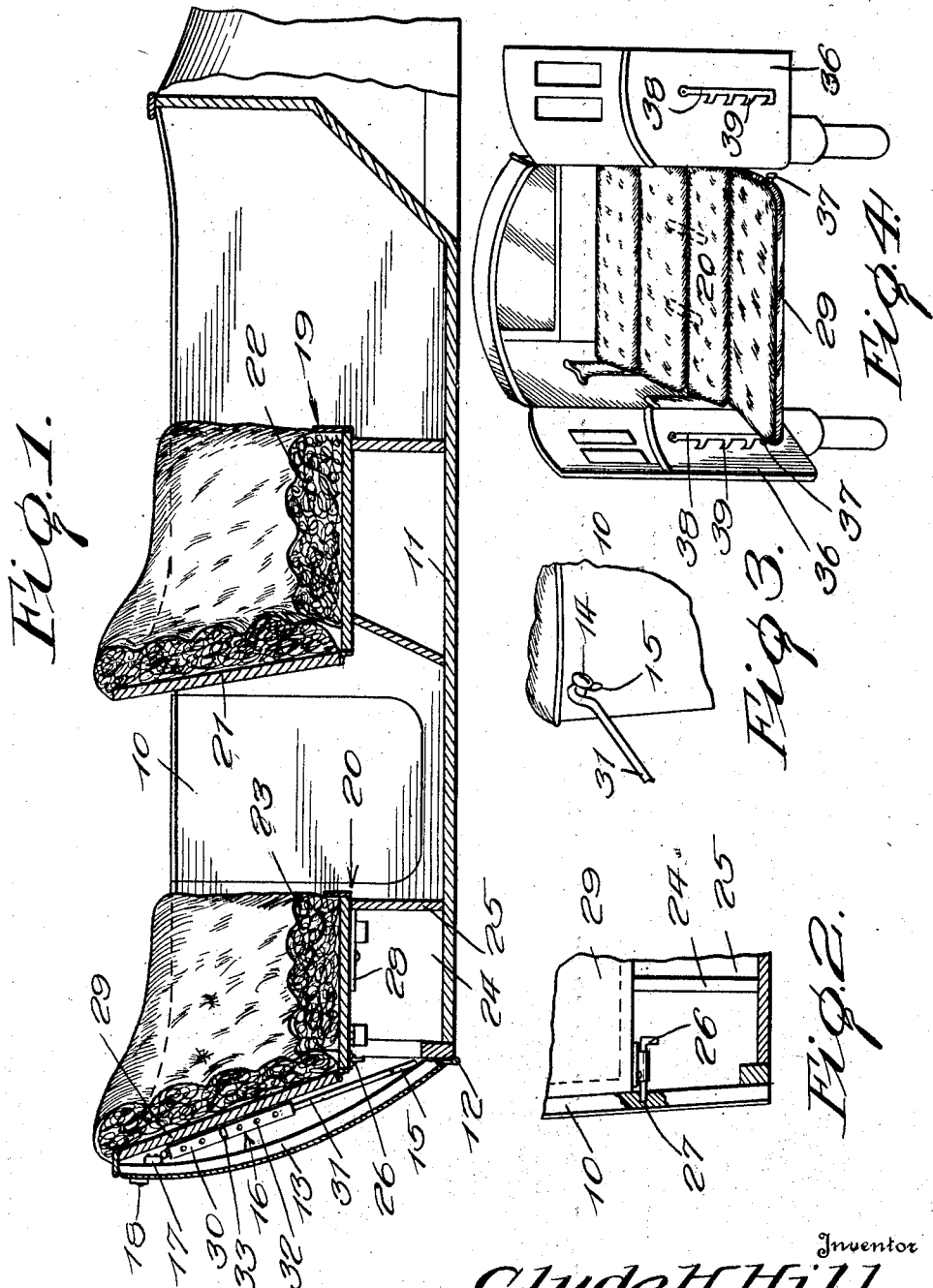
Inventor
Clyde H Hill
By Watson E. Coleman
Attorney

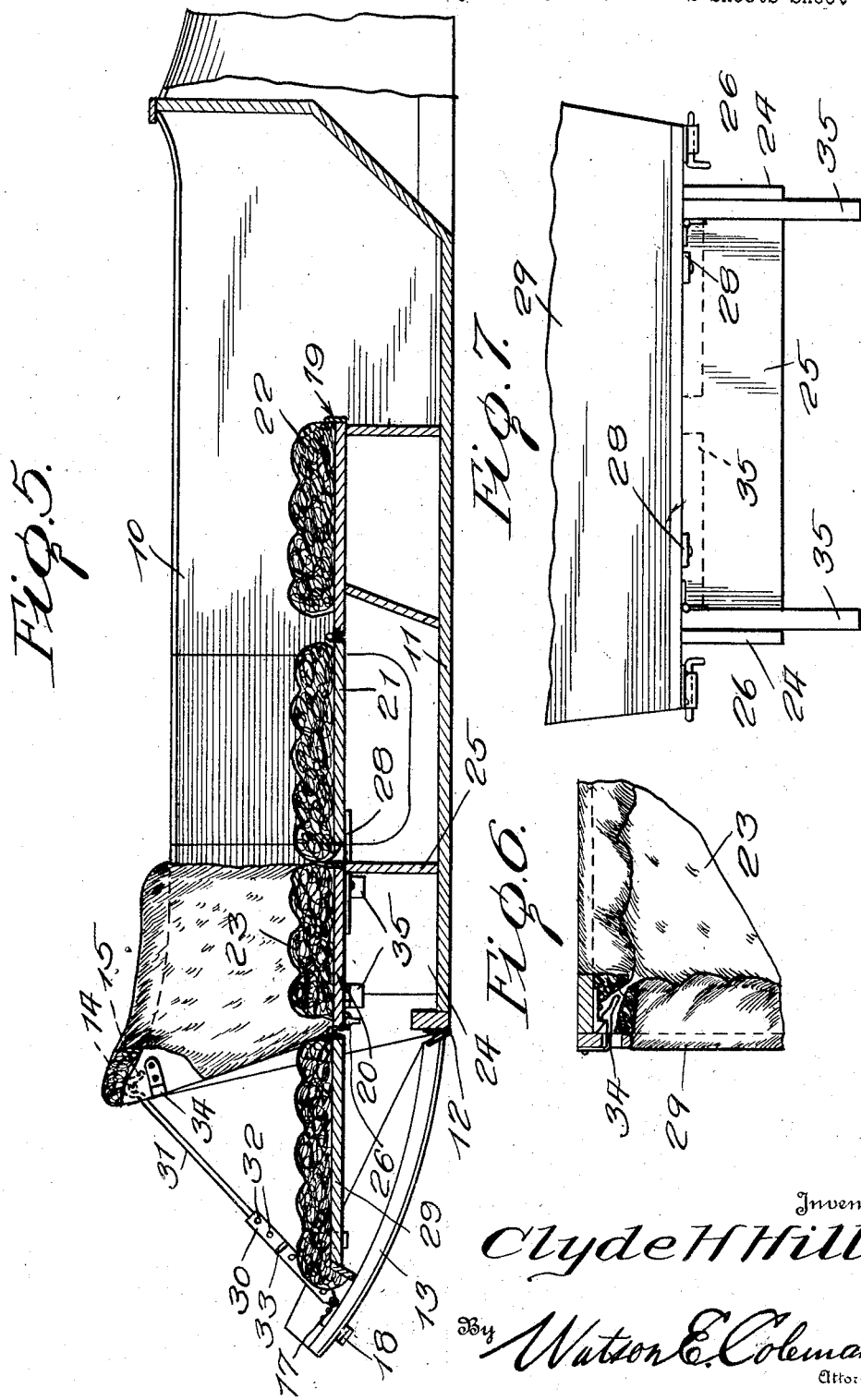

Patented Mar. 17, 1925.

1,530,048

UNITED STATES PATENT OFFICE.

CLYDE H. HILL, OF INDEPENDENCE, OREGON.

VEHICLE BODY.

Application filed April 30, 1923. Serial No. 635,640.

*To all whom it may concern:*

Be it known that I, CLYDE H. HILL, a citizen of the United States, residing at Independence, in the county of Polk and State of Oregon, have invented certain new and useful Improvements in Vehicle Bodies, of which the following is a specification, reference being had to the accompanying drawings.

This invention relates to vehicle bodies and more particularly to an improvement in the construction of the bodies of automobiles.

An important object of the invention is to provide a body construction for the type of car generally referred to as a touring car whereby the body may be readily converted for use as a sleeping compartment or as a truck.

A further object of the invention is to provide a construction in which the rear seat is so mounted and constructed that it may be removed to permit use of the body rearwardly of the front seat thereof for storage purposes, the removable seat being capable of use as such when removed being provided with foldable legs for this purpose.

A further object of the invention is to provide a device of this character wherein the removable seat is shiftable within the body to adjusted positions and is provided with means for supporting the hinged back of the forward seat to combine therewith to form a bed.

A further object of the invention is to provide a device of this character wherein the body has a hinged rear section movable to adjusted positions and which hinged rear section forms a support for a hinged back forming a part of the shiftable rear seat when the vehicle body is arranged to form a sleeping compartment.

These and other objects I attain by the construction shown in the accompanying drawings, wherein for the purpose of illustration is shown a preferred embodiment of my invention and wherein:—

Figure 1 is a longitudinal sectional view through a vehicle body constructed in accordance with my invention;

Figure 2 is a detailed view showing the manner of securing the slidable seat against movement;

Figure 3 is a detailed view showing the engagement of the back supports with the body;

Figure 4 is a perspective showing the construction employed with limousine bodies;

Figure 5 is a view similar to that shown in Figure 1, the body being converted to form a sleeping compartment;

Figure 6 is a detailed view showing the catches of the back seat; and

Figure 7 is an enlarged detailed view showing the back seat removed and supported by the foldable legs thereof.

Referring now more particularly to the drawings, the body comprises sides 10 connected by a floor 11 to which at the rear of the body is hinged, as at 12, a back section 13 swinging downwardly to closed position. The side members 10 at the rear are provided interiorly with lugs 14 adapted for engagement by hooks 15 of longitudinally adjustable supporting members 16 pivotally connected at their opposite ends, as at 17, to the inner face of the rear section 13 adjacent the upper end thereof. The lugs 14, when the rear section 13 is in the closed position, are engaged by spring catches 18 coacting with the lugs to hold the rear section in the closed position.

Arranged within the body are front and rear seats 19 and 20. The front seat 19 is stationary as respects the body and has the back section 21 thereof pivoted so that it may be swung to horizontal position in alignment with the seat 22 thereof. The rear seat 20 has the seat portion 23 thereof provided upon its under surface with downwardly extending supports 24 and 25, these supports combining to form the front and side walls of a storage compartment, the upper wall of which is formed by the seat bottom, the lower wall by the car bottom 11 and the rear wall by the hinged rear section 13 when in the closed position.

The supports 24 and 25 are slidable upon the floor of the car and the seat bottom is provided at the sides thereof with spring bolts 26 coacting with longitudinally spaced openings 27 formed in the sides 10 of the car, so that the seat 20 may be slid toward the front seat 19 and secured in adjusted positions. This seat bottom is provided at its forward edge with slidable supporting members 28 which may be swung to a position beneath the edge of the seat or so that they extend toward the front seat 19. It will be obvious that by properly adjusting the rear seat 20 toward the front seat and extending the supporting members 28, these supporting members will support the hinged back 21 of the front seat in such a manner as to form a continuous cushioned platform between the front of the front seat and the rear edge of the seat portion 23 of the rear seat 20.

The back section 29 of the rear seat 20 is pivotally connected at its lower edge to the rear edge of the seat portion 23 of this rear seat and may be swung into alignment with the seat portion to form a continuation of the cushioned platform, hereinbefore referred to. The upper edge of the back portion 29 of the seat when in horizontal position is supported by the back section 13 which is adjusted to provide the proper support through its adjustable supports 16, hereinbefore referred to. These adjustable supports are in the present instance shown as tubes 30 pivotally connected to the rear section 13 in which are telescopically engaged rods 31 bearing the hooks 15, hereinbefore referred to, the tubes 30 and rods 31 being provided with longitudinally spaced openings 32 selectively receiving retaining bolts 33 for maintaining the sections in adjusted position. The hinged back sections of the front and rear seats are provided with spring catches 34 at their sides engaging the side members of their respective seats to maintain these hinged sections in elevated position when their use in this manner is desired. The rear seat 20 may be bodily removed from the vehicle and is provided upon its under surface with folding legs 35 by means of which it may be supported for use as a seat exteriorly of the vehicle.

By the construction hereinbefore set forth it will be seen that by removing the rear seat 20 a compartment of considerable size is formed in the vehicle body rearwardly of the front seat, permitting storage of a considerably quantity of material therein. By swinging the rear section 13 of the body to the horizontal position this rear section forms a continuation of the bottom 11 of the body and accordingly increases the carrying space afforded by the body, permitting the body to be employed as a light truck. By shifting the seat 20 forwardly and swinging the backs of the front and rear seats to horizontal position and adjusting the rear section 13 so that it properly supports the back 29 of the rear seat, it will be seen that a sleeping compartment of considerable length is formed, the major portion of which is covered and protected by the top of the vehicle. The rear section 13 when in horizontal position forms a table and the seat 20 may be removed and employed as a seat outwardly of the vehicle by simply adjusting the folding legs 35 thereof. It is furthermore pointed out that the compartment formed beneath the rear seat 20, hereinbefore referred to, is readily accessible at all times and accordingly forms an ideal place for the storage of such tools as might be needed upon the road since the contents thereof can be made accessible without disturbing the occupants of the vehicle by simply releasing the rear section 13 and allowing the same to swing to horizontal position.

In applying this construction to limousine bodies in lieu of hinging the back to the bottom of the vehicle, as hereinbefore set forth, this back is preferably formed in two hinged sections 36, coming together at the center of the back of the vehicle and hinged to the sides of the vehicle to be swung to open position. The back 29 of the rear seat 20 is provided at the sides thereof with outstanding hook lugs 37 and to each of the doors or sections 36 are pivoted the upper ends of hook bars 38. These bars are provided along their length with vertically spaced outstanding hooks 39, interchangeably receiving the hook lugs 37 of the seat back 29 to support the same at a desired angle. It will furthermore be obvious that the structure hereinbefore set forth is capable of further uses and likewise capable of some change and modification without materially departing from the spirit of my invention and I accordingly do not limit myself to such specific structure except as hereinafter claimed.

I claim:—

1. A vehicle body, comprising sides, bottom and a rear section pivoted at its lower end to the bottom, front and rear seats within the body and each having a pivoted back section, the rear seat embodying means receiving the hinged back section of the front seat when in horizontal position to support the same, the hinged back section of the body adjustably supporting the hinged back of said rear seat to determine the degree of inclination thereof.

2. A vehicle body, comprising sides, bottom and a hinged rear section, front and rear seats within the body and each having a pivoted back section, the rear seat embodying means receiving the hinged back section of the front seat when in horizontal position to support the same, the hinged back section of the body adjustably supporting the hinged back of said rear seat, said rear seat being slidably mounted upon the body for adjustment toward and away from the front seat and including means whereby it may be secured in adjusted position.

3. A vehicle body, comprising sides, bottom and a hinged rear section, front and rear seats within the body and each having a pivoted back section, the rear seat embodying means receiving the hinged back section of the front seat when in horizontal position to support the same, the hinged back section of the body adjustably supporting the hinged back of said rear seat, said rear seat being slidably mounted upon the body for adjustment toward and away from the front seat and including means whereby it may be secured in adjusted position, the slidable support of said rear seat combining with the bottom of the vehicle, the seat and the back section of the vehicle body when in closed position to form a storage compartment.

In testimony whereof I hereunto affix my signature.

CLYDE H. HILL.